(12) United States Patent
Goto et al.

(10) Patent No.: US 6,665,200 B2
(45) Date of Patent: Dec. 16, 2003

(54) AIR CONDITIONER INCLUDING A CONTROL UNIT POWERED BY A SWITCHING POWER SUPPLY

(75) Inventors: Naomi Goto, Shiga (JP); Nobuyuki Nishii, Shiga (JP); Yasufumi Kurahashi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/159,382

(22) Filed: May 31, 2002

(65) Prior Publication Data
US 2003/0034761 A1 Feb. 20, 2003

(30) Foreign Application Priority Data
Jun. 6, 2001 (JP) .......................................... 2001-170599

(51) Int. Cl.[7] ................................................. B60H 1/00
(52) U.S. Cl. ............................... 363/55; 62/230; 62/243
(58) Field of Search ....................... 363/55, 50; 62/230, 62/243

(56) References Cited

U.S. PATENT DOCUMENTS

| | | | | | |
|---|---|---|---|---|---|
| 5,371,645 | A | * | 12/1994 | Mochizuki | .................... 361/22 |
| 5,408,842 | A | * | 4/1995 | Goto et al. | .................... 62/230 |
| 5,428,967 | A | * | 7/1995 | Goto et al. | .................... 62/230 |
| 5,714,806 | A | * | 2/1998 | Goto et al. | ................ 307/10.1 |
| 6,278,910 | B1 | * | 8/2001 | Miura et al. | ................. 700/297 |
| 6,384,558 | B2 | * | 5/2002 | Yoshida et al. | ............. 318/445 |
| 6,539,739 | B2 | * | 4/2003 | Goto et al. | .................... 62/244 |

* cited by examiner

*Primary Examiner*—Bao Q. Vu
(74) *Attorney, Agent, or Firm*—RatnerPrestia

(57) ABSTRACT

In an air conditioner including a control unit receiving a power from a switching power supply, the switching power supply is connected to a DC power source without passing through a switch device or power application device. The output of the switching power supply is connected to a capacitor via a diode. The control unit is able to operate even when the capacitor to be charged via the power application device is not charged. Accordingly, the motor-driven compressor may start to operate quickly.

6 Claims, 10 Drawing Sheets

AIR CONDITIONER INCLUDING A CONTROL UNIT POWERED BY A SWITCHING POWER SUPPLY

FIELD OF THE INVENTION

The present invention relates to an air conditioner including a motor-driven compressor operated with power supplied from a DC power source.

BACKGROUND OF THE INVENTION

A conventional air conditioner for vehicles including a motor-driven compressor operated with power supplied from a DC power source is shown in FIG. 9. The air conditioner includes output unit 11 for DC/AC-converting a DC current for supply an AC current to motor-driven compressor 14, and capacitor 7 for smoothing the DC current of rectangular waveform. While breaker 3 being closed, the capacitor 7 is charged by battery 1 via fuse 2, breaker 3, and reverse-connection-protecting diode 4 through a charge resistor 5 for preventing a charge inrush current. The reverse-connection-protecting diode 4 protects the circuit by cutting off the current if the battery 1 is connected in reverse polarity.

Control unit 10, upon receiving a command to operate the motor-driven compressor 14 from air-conditioner controller 12, detects the charge of capacitor 7 and closes relay 6, for example, when the voltage of capacitor 7 detected by voltage detector 8 reaches a predetermined level. Then, the control unit 10 instructs the output unit 11 to drive the motor-driven compressor 14. The control unit 10 is supplied with power from 12V power source 13. Switching power supply 9 converts the voltage of battery 1 to supply the power to the output unit 11 and voltage detector 8. Control unit 10, upon receiving a command to stop the motor-driven compressor 14 from the air-conditioner controller 12, stops the output of the output unit 11 and opens the relay 6.

The control unit 10 is always in operation since receiving a power from 12V power source 13. Accordingly, the unit is always possible to communicate with controller 12, receive a signal from a sensor for air conditioning, and check the circuit with a circuit-checking device.

FIG. 10 is a circuit diagram of another conventional air conditioner. The control unit 10 receives a power from switching power supply 9, and receives no power from 12V power source 13. The conditioner has a simple structure in which a connection with 12V power source 13 is not needed, and a common ground can be used for the control unit 10 and other circuits. Constant current charging circuit 15 supplies a constant current obtained through subtracting a base-emitter voltage of a transistor from a zener voltage of a zener diode and dividing it by a resistance of an emitter resistor. For example, in cases that the zener voltage is 17V, that the base-emitter voltage is 2V, and that the resistance is 50 ohm, the constant current is 0.3A.

If capacitor 7 is not charged for the case of being out of order, the voltage of capacitor 7 is 0V, and the supply voltage of switching power supply 9 connected in parallel with capacitor 7 is also 0V. In that case, switching power supply 9 is not in operation, and the control unit 10 receiving a power from switching power supply 9 is not in operation, either. Accordingly, control unit 10 cannot check the circuit, communicate with air controller 12, or receive the signal from the sensor before capacitor 7 is charged. The conventional conditioner in FIG. 9 involves no problems because the control unit 10 is always in operation. The conditioner in FIG. 10 has a similar problem even in case charge resistor 5 is provided in place of constant-current charging circuit 15.

While motor-driven compressor 14 is not in operation, capacitor 7 is preferably discharged for energy saving and operation time shortening in order to enhance the lifetime of the conditioner. However, if capacitor 7 is discharged, the control unit 10 does not operate as described above. In the conditioner shown in FIG. 9, the capacitor 7 is discharged with opening breaker 3, but there arises no problem because the control unit 10 is always in operation.

If capacitor 7 is discharged while motor-driven compressor 14 is not in operation, the capacitor 7 needs to be charged before starting operating the motor-driven compressor 14, thus requiring a time for motor-driven compressor 14 to start operating. This problem is common to the conditioner in FIG. 9.

SUMMARY OF THE INVENTION

In an air conditioner including a control unit receiving a power from switching power supply, the control unit operates even when a capacitor is not charged. The air conditioner includes: a power application device coupled seriously to a DC power source; a switch device coupled in parallel with the power application device; a capacitor charged by the DC power source via the power application device; a voltage detector for detecting the voltage of the capacitor; an output unit for driving a motor-driven compressor for air conditioning, receiving a power from the DC power source via the switch device; a control unit for controlling the output unit; and a power supply for supplying a power to the control unit, receiving a power from the DC power source without though the switch device or the power application device.

DESCRIPTION OF THE PREFERRED EMBODIMENT (Embodiment 1)

Figure 1:
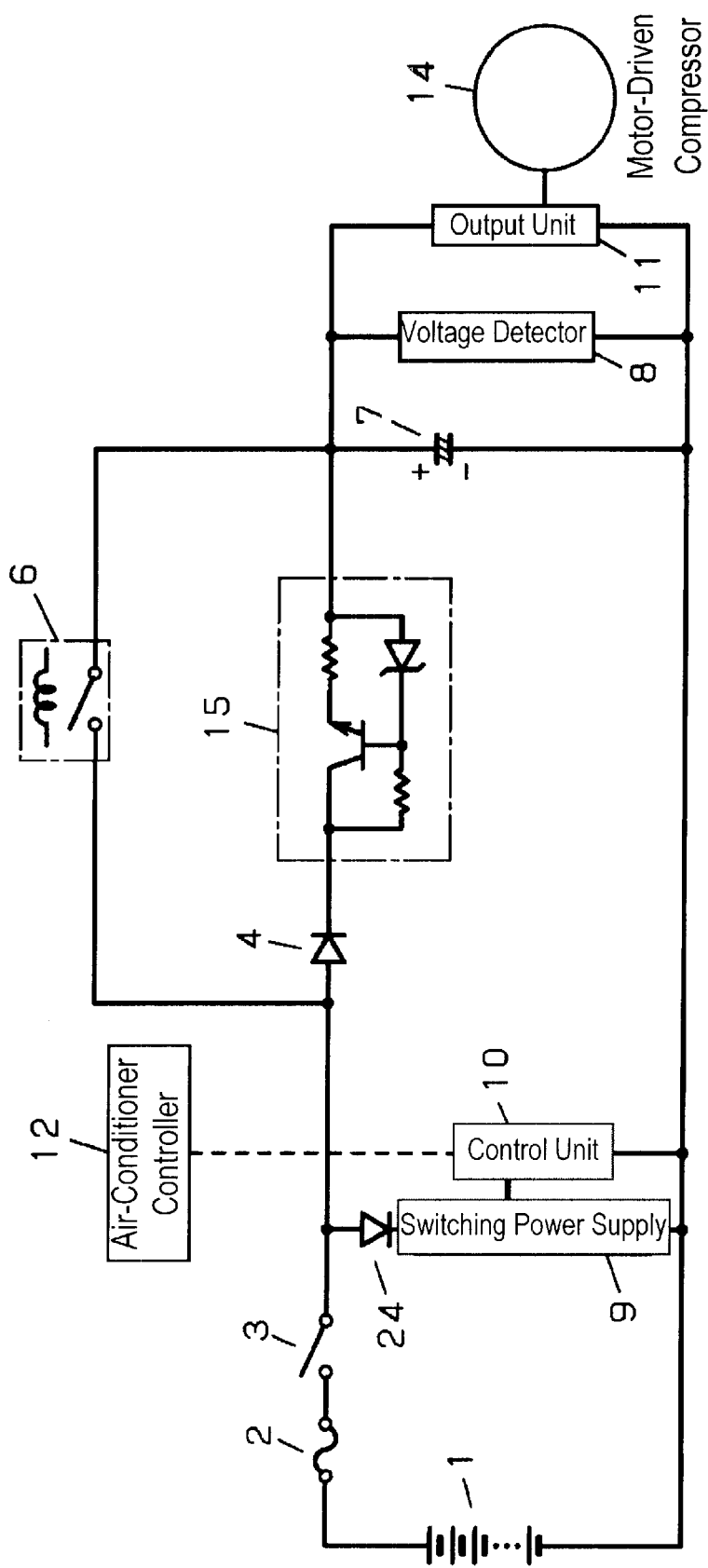
FIG. 1 is a circuit diagram of an air conditioner according to a first embodiment of the present invention.

FIG. 1 is a circuit diagram of an air conditioner according to a first embodiment of the present invention. When breaker 3 is closed, battery 1 is connected to switching power supply 9 via fuse 2, breaker 3, and reverse-connection-protecting diode 24. Thus, a power is supplied from switching power supply 9 to the control unit 10. Accordingly, the control unit 10 operates even before capacitor 7 is charged, thus being able to check the circuit, communicate with an air-conditioner controller, and receive a signal from a sensor.

When breaker 3 is closed, capacitor 7 is charged with a constant current from battery 1 via fuse 2, breaker 3, and reverse-connection-protecting diode 4 through constant-current-charging circuit 15 for preventing a charge inrush current. Control unit 10 checks the circuit with a voltage detected by voltage detector 8. When the voltage is 0V, for example, control unit 10 judges that capacitor 7 or output unit 11 is short-circuited, or that a power application circuit including constant current charging circuit 15 is out of order. When the voltage is between 0V and the voltage of battery 1, for example, control circuit 10 judges that output unit 11 is half-short-circuited, or that capacitor 7 is connected in reverse polarity. The result of the checking is transmitted to air-conditioner controller 12. Air controller 12 opens breaker 3 as needed.

Switching power supply 9, upon being connected in parallel with capacitor 7 as in a conventional air conditioner, does not receive a power when the voltage of capacitor 7 is 0V or lower. Therefore, control unit 10 cannot check the circuit since not receiving a power from switching power supply.

Control unit 10, upon receiving a command to control motor-driven compressor 14 from air conditioner controller 12, detects the charge of capacitor 7. For example, when the voltage of capacitor 7 detected by voltage detector 8 reaches a predetermined level, control unit 10 closes relay 6. Next, control unit 10 instructs output unit 11 to drive motor-driven compressor 14. Switching power supply 9 converts the voltage of battery 1 for supplying a power to output unit 11 and voltage detector 8.

Control unit 10, upon receiving a command to stop motor-driven compressor 14 from air-conditioner controller 12, stops the output of output unit 11 and opens relay 6. Control unit 10 preferably receives signals from sensors (e.g. for detecting a temperature of motor-driven compressor 14) required for air conditioning.

(Embodiment 2)

Figure 2:
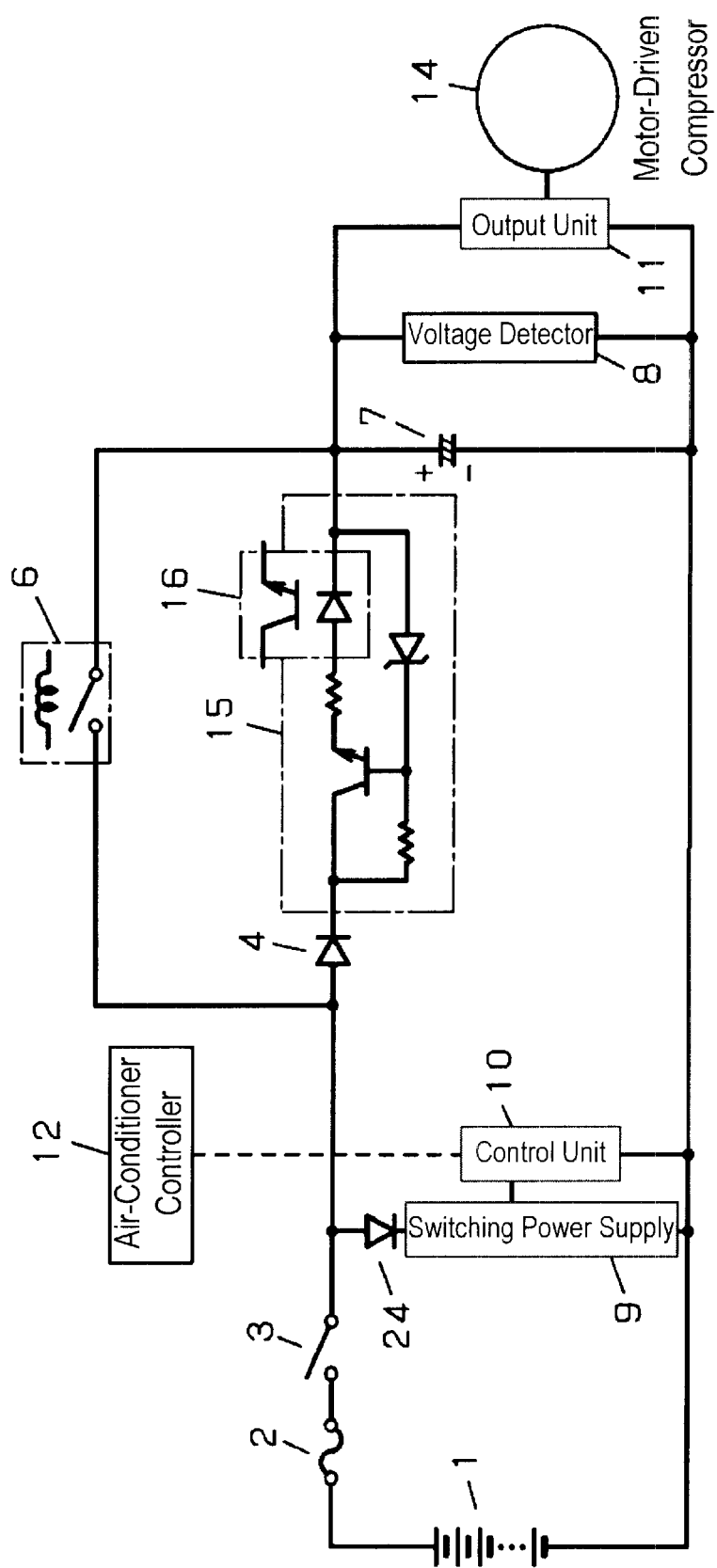
FIG. 2 is a circuit diagram of an air conditioner according to a second embodiment of the invention.

FIG. 2 is a circuit diagram of an air conditioner according to a second embodiment of the invention. Charging-current-detecting photocoupler 16 as a power application detector is connected to a constant-current-charging circuit 15 of FIG. 1 in embodiment 1. This enables control unit 10 to check the circuit accurately. When the voltage detected by voltage detector 8 is 0V, control unit 10 confirms a signal from charging-current-detecting photocoupler 16. The unit judges that capacitor 7 or output unit 11 is short-circuited if a charging current flows, and judges that a power application circuit including the constant-current-charging circuit 15 is out of order if the charging current does not flow. In charging-current-detecting photocoupler 16, a charging current applied to LED turns on a phototransistor, and then control unit 10 may judge that charging current flows with the phototransistor turned on.

(Embodiment 3)

Figure 3:
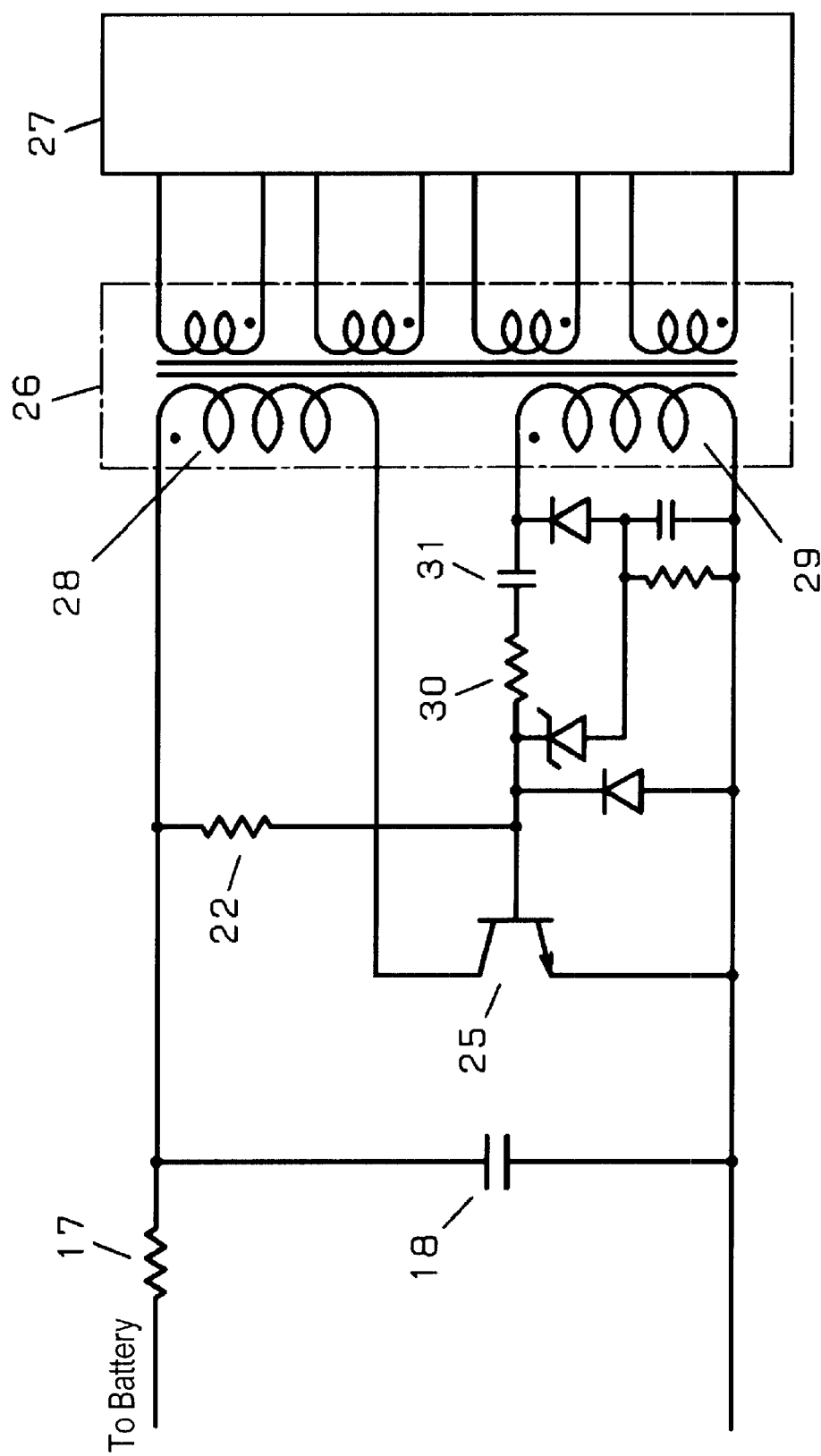
FIG. 3 is a circuit diagram of a switching power source according to a third embodiment of the invention.

FIG. 3 shows a circuit of a switching power supply of a self-excited fly-back converter type used for switching power supply 9 in embodiment 1. Voltage-rise-delay resistor 17 and voltage-rise-delay capacitor 18 connected to an input potion from a power source battery delays a voltage rise at the input potion.

Switching power supply 9 operates as follows. When a power is applied from the battery, a base current flows to switching transistor 25 from start base resistor 22. Then, a voltage is applied to primary coil 28, and a voltage is generated at self-excited coil 29 as well. Thus, greater base current flows via base resistor 30 and base capacitor 31. This turns on switching transistor 25, and sets collector voltage Vc to 0V and has a collector current Ic flow. A time increase ratio dic/dt of collector current Ic can be represented by E/L, where L is an inductance of primary coil 28, and E is a voltage of battery 1. Collector current Ic rises up to the product hFE·IB, where hFE is a current amplification ratio of switching transistor 25, and IB is a base current. When current Ic reaches the current, voltage VL of first coil 28 decreases, and a voltage of self-excited coil 29 also decreases. And base current IB accordingly decreases, thus turning off switching transistor 25.

Voltage E of battery 1, upon being low or increasing slowly, creates no problem. A high DC voltage of battery 1, upon being directly applied to the power supply, has a high base current flow through base resistor 30 and base capacitor 31 since a voltage generated at self-excited coil 29 is very high. This has collector current Ic of the switching transistor rise up to a large value determined by the product hFE·IB of current amplification ratio hFE and base current IB, and may therefore break switching transistor 25. Therefore, voltage rise delay resistor 17 and voltage rise delay capacitor 18 connected to the battery 1 are provided in order to delay the rise of the voltage of the power source.

Resistor 17 and capacitor 18 are also effective for such case that the voltage from battery 1 is momentarily cut off. In case the voltage from battery 1 is momentarily cut off, capacitor 18 may apply a current. For example, if an average current consumed in switching power supply 9 is 10 mA, and if an allowable voltage drop in momentary time of 1 ms is 30V, then capacitor 18 is preferably to be 1 $\mu$F. Since an outflow charge of capacitor 18 is 10 $\mu$C (=10 mA×1 ms), the voltage drop is 10V (=10 $\mu$C/1 $\mu$F), which is lower than the allowable voltage drop of 30V.

(Embodiment 4)

Figure 4:
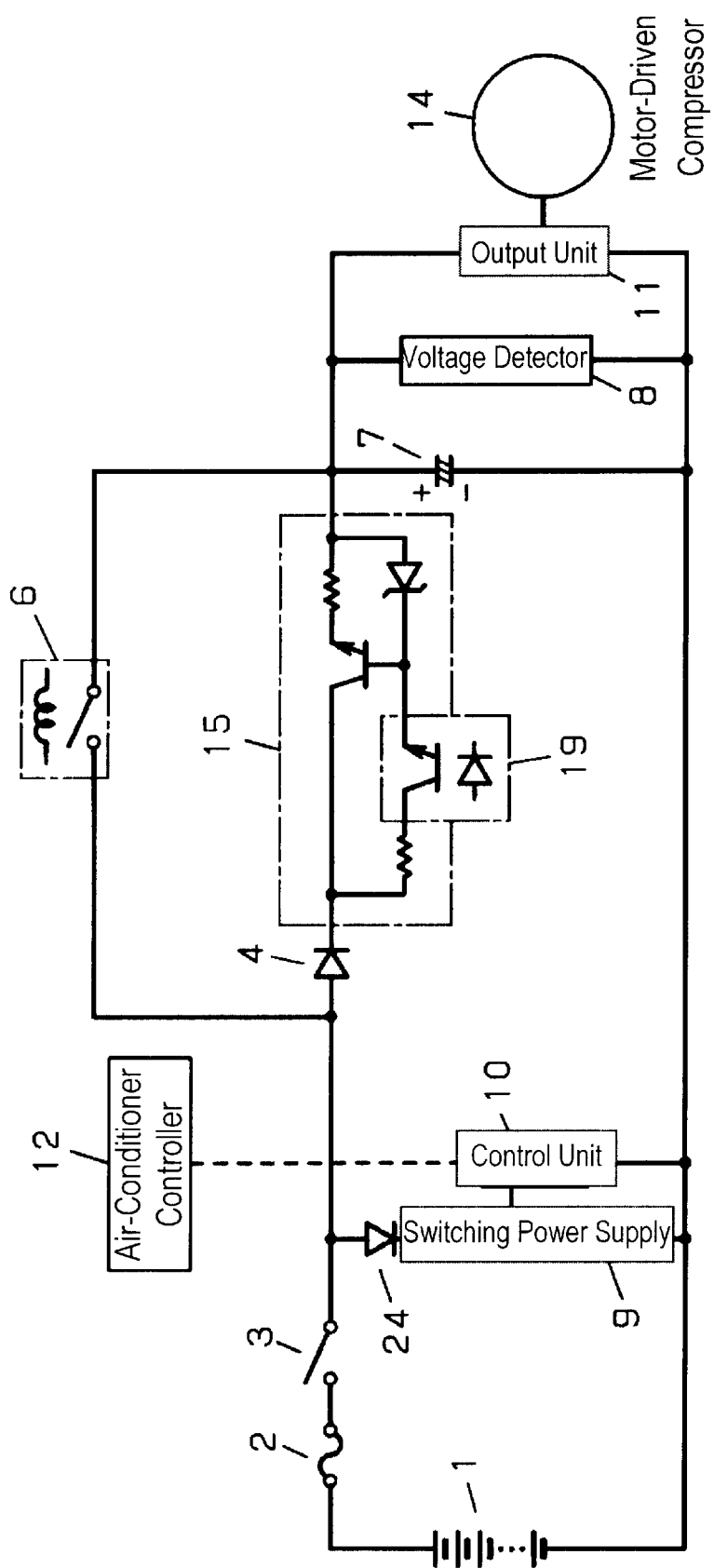
FIG. 4 is a circuit diagram of an air conditioner according to a fourth embodiment of the invention.

FIG. 4 is a circuit diagram of an air conditioner according to a fourth embodiment of the present invention. Charge-ON/OFF photocoupler 19 as a power application control unit is connected to constant-current-charging circuit 15 in FIG. 1 in embodiment 1.

When a circuit checking according to embodiment 1 shows that a circuit is defective, control unit 10 turns off constant-current-charging circuit 15 with photocoupler 19 in order to avoid wasteful consumption of power by the defective circuit. In the photocoupler 19, a current applied to LED turns on a phototransistor, and the current, upon being cut off, turns off the phototransistor.

When motor-driven compressor 14 does not operate, control unit 10 may discharge capacitor 7 by turning off relay 6 and turning off constant-current-charging circuit 15 with charge-ON/OFF photocoupler 19. Capacitor 7 may be preferably discharged, for example, through driving motor-driven compressor 14 momentarily. Thus, no power is supplied to voltage detector 8, and power consumption can be acordingly avoided.

(Embodiment 5)

Figure 5:
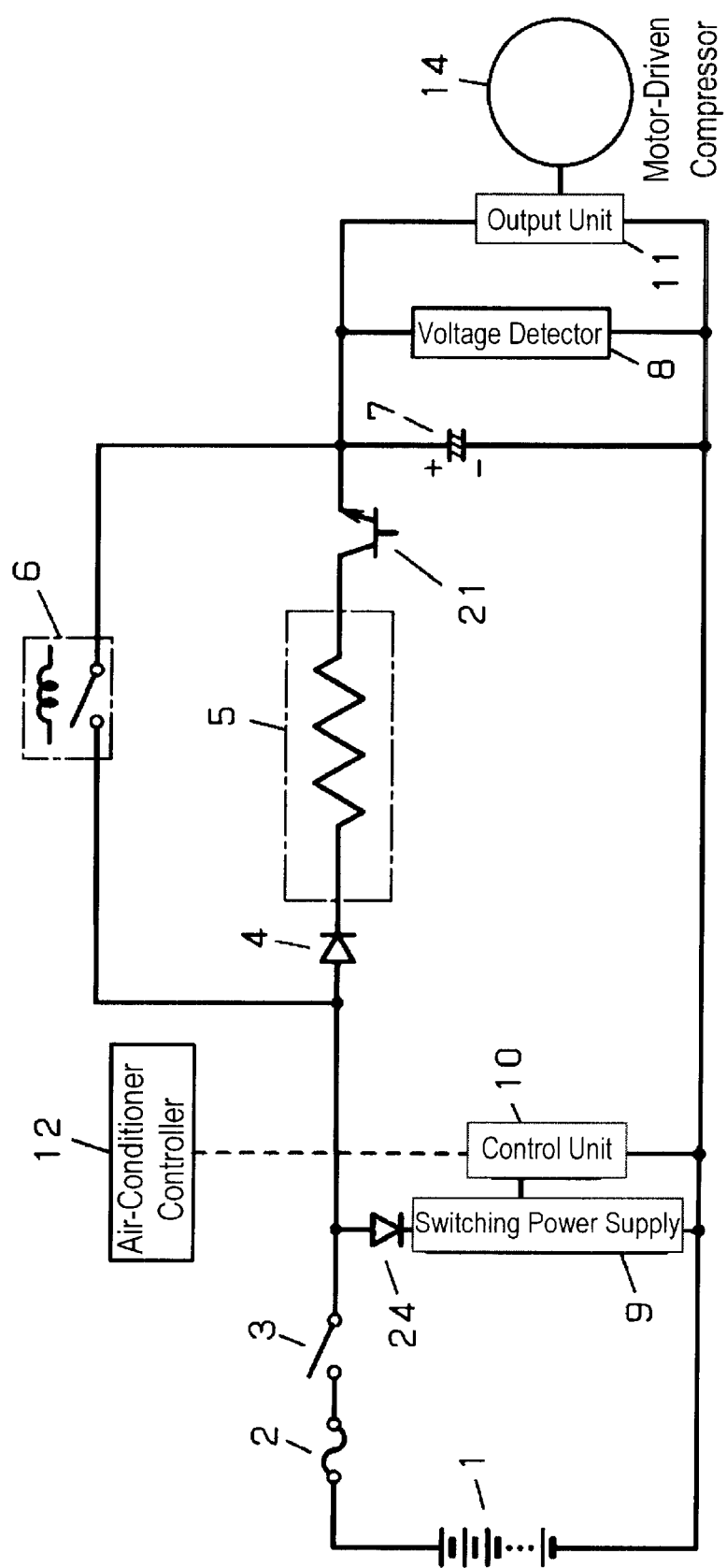
FIG. 5 is a circuit diagram of an air conditioner according to a fifth embodiment of the invention.

FIG. 5 is a circuit diagram of an air conditioner according to a fifth embodiment of the present invention. The air conditioner includes charge resistor 5 in place of constant-current-charging circuit 15 in FIG. 4 in embodiment 4, and charge-ON/OFF transistor 21 in place of charge-ON/OFF photocoupler 19 as a power application control unit. The conditioner of the fifth embodiment has the same functions and advantages as in embodiment 4.

(Embodiment 6)

Figure 6:
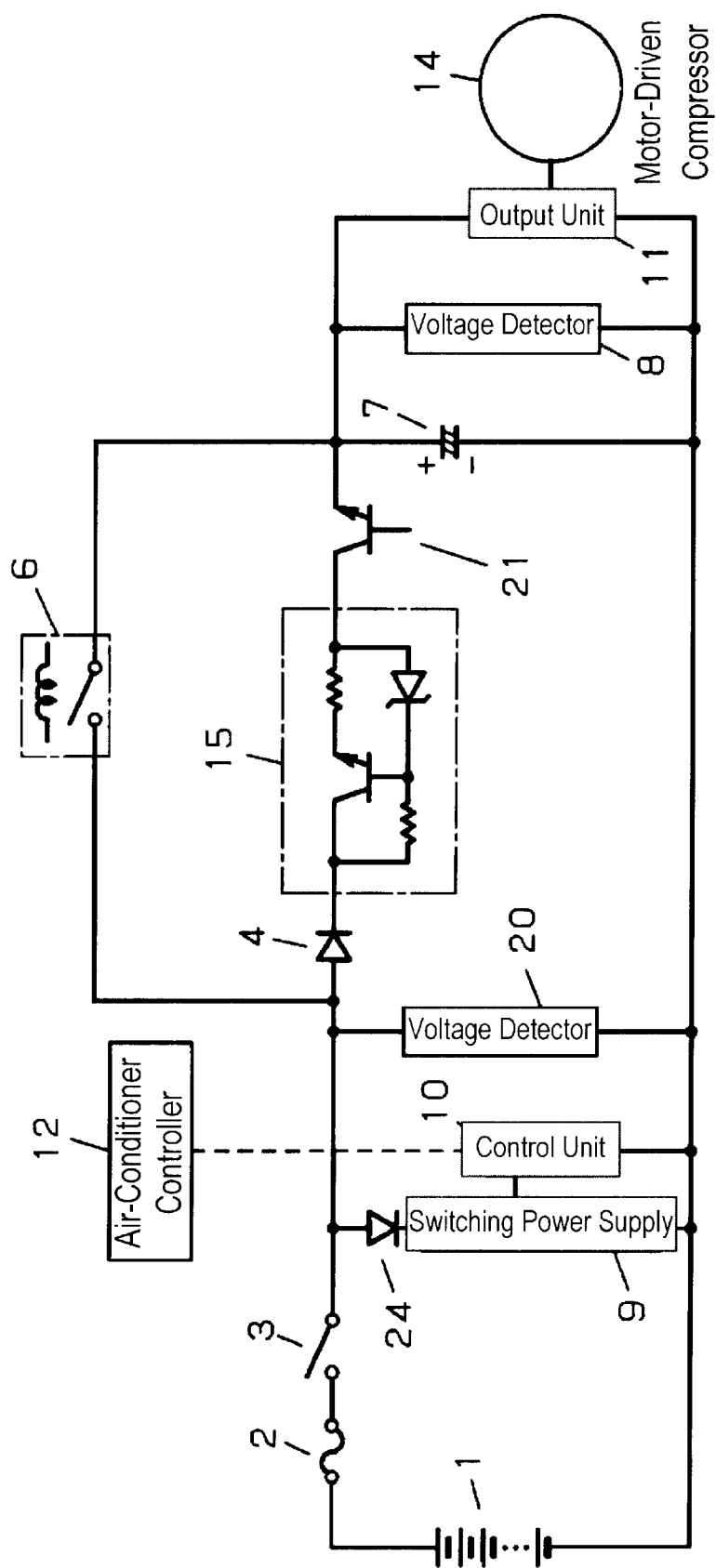
FIG. 6 is a circuit diagram of an air conditioner according to a sixth embodiment of the invention.

FIG. 6 is a circuit diagram of an air conditioner according to a sixth embodiment of the present invention. In a conditioner of FIG. 1 in embodiment 1, battery-voltage detector 20 as a voltage detecting device is disposed in parallel with switching power supply 9, and charge-ON/OFF transistor 21 is disposed as a power application control unit.

In this configuration, when breaker 3 closes, control unit 10 may detect the voltage of battery 1 with battery voltage detector 20. When the voltage is higher than an allowable level, control unit 10 has charge-ON/OFF transistor 21 stop an operation for charging capacitor 7 through constant-current-charging circuit 15. This protects capacitor 7, output unit 11, and others from an overvoltage applied thereto.

When motor-driven compressor 14 stops, control unit 10 may turn off relay 6, and has charge-ON/OFF transistor 21 stop an operation of charging capacitor 7 through constant-current-charging circuit 15. This discharges capacitor 7, while battery voltage detector 20 and switching power supply 9 are able to operate since being connected to battery 1. Accordingly, control unit 10 may check the voltage of battery 1 with battery voltage detector 20 and transmit a result of the voltage detection of detector 20 to air-conditioner controller 12. In a conventional air conditioner, the control unit is unable to operate when the capacitor is discharged. Voltage detector 8 is used for checking the circuit and detecting the charge of capacitor 7 similarly to embodiment 1.

(Embodiment 7)

Figure 7:
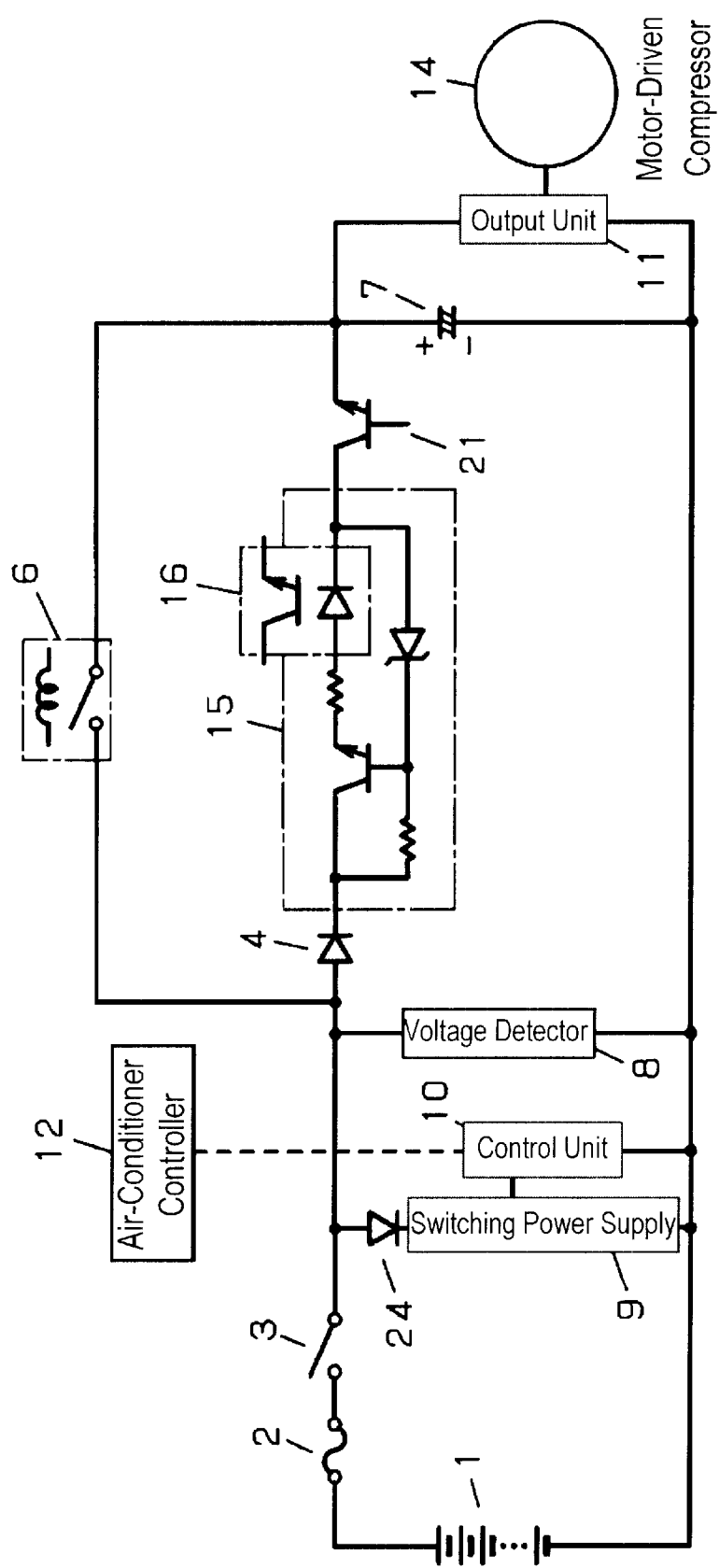
FIG. 7 is a circuit diagram of an air conditioner according to a seventh embodiment of the invention.

FIG. 7 is a circuit diagram of an air conditioner according to a seventh embodiment of the present invention. Charging-current-detecting photocoupler 16 as a power application detector is connected to constant-current-charging circuit 15 of FIG. 6 in embodiment 6, and voltage detector 8 is disposed in place of battery voltage detector 20. Voltage detector 8 may detect and check the voltage of battery 1 similarly to battery voltage detector 20, and this provides the conditioner with the same advantages as in embodiment 6.

Charging-current-detecting photocoupler 16 operates for checking a circuit and detecting the charge of capacitor 7. For checking the circuit, control unit 10 measures a time of a charging current flow from constant-current-charging circuit 15 with charging-current-detecting photocoupler 16 after turning on charge-ON/OFF transistor 21. In normal operation, the capacitor is charged for a predetermined period of time. If the charging current keeps flowing after lapse of the predetermined period, it is judged that the circuit including capacitor 7 is defective due to a short-circuit or the like. The charging current, upon stopping flowing, indicates that capacitor 7 is charged.

(Embodiment 8)

Figure 8:
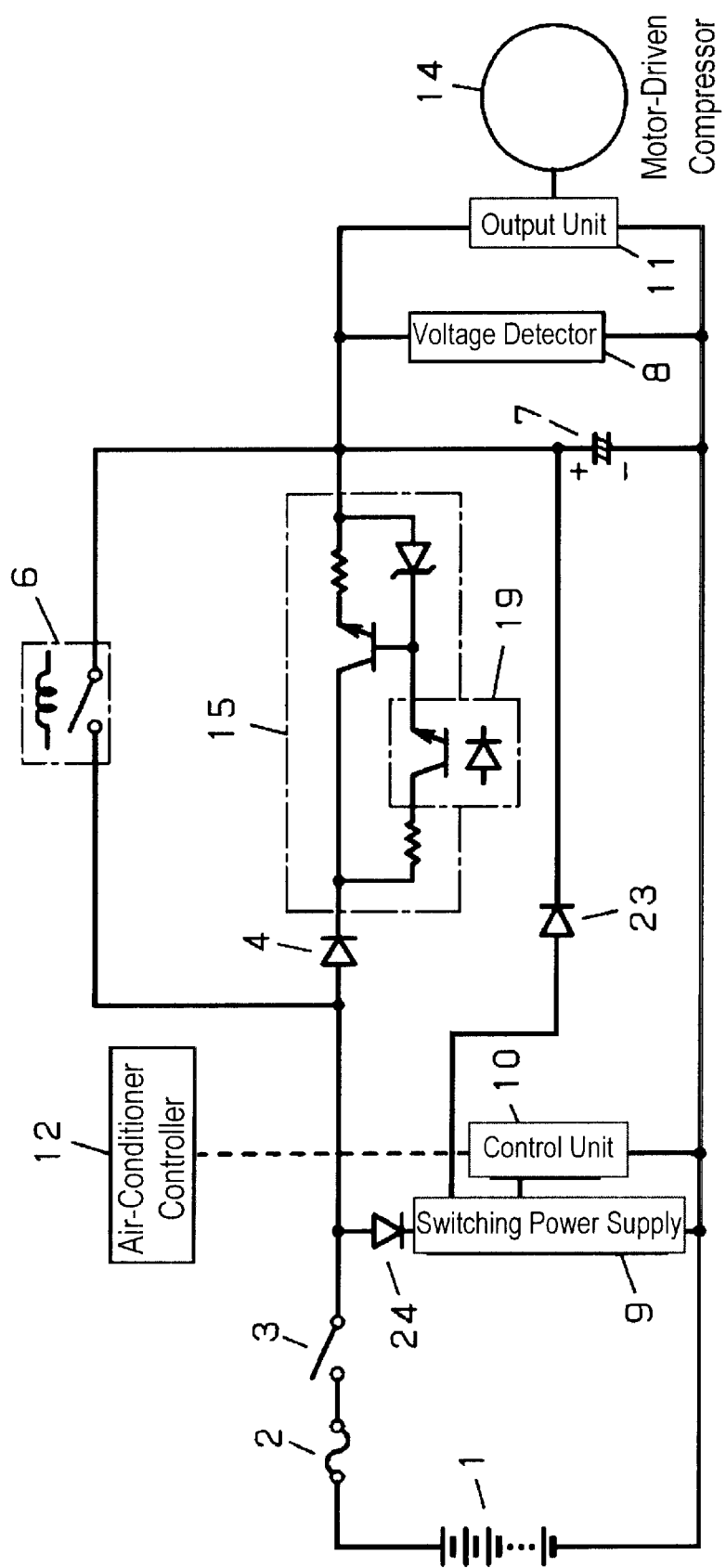
FIG. 8 is a circuit diagram of an air conditioner according to an eighth embodiment of the invention.
Figure 9:
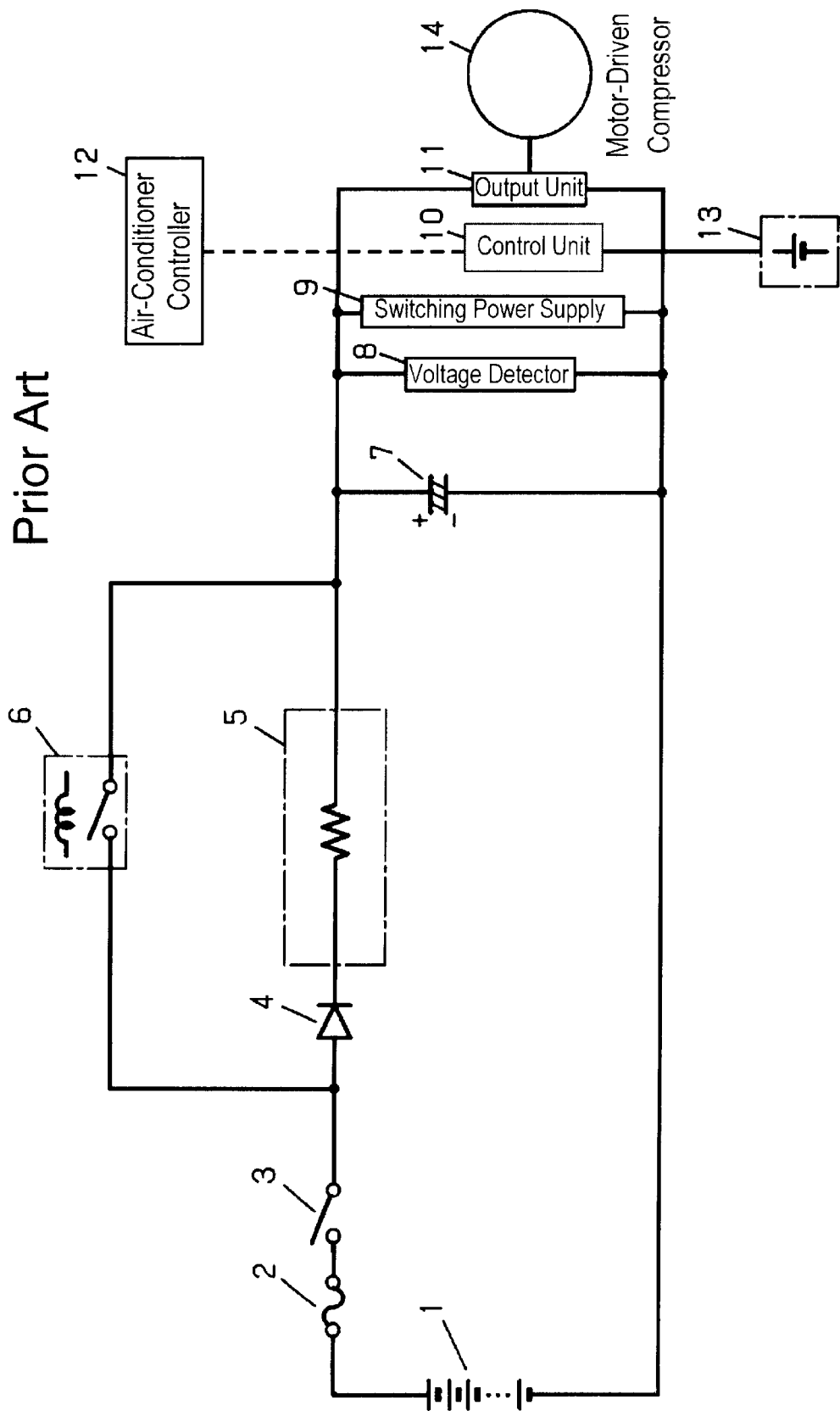
FIG. 9 is a circuit diagram of a conventional air conditioner.
Figure 10:
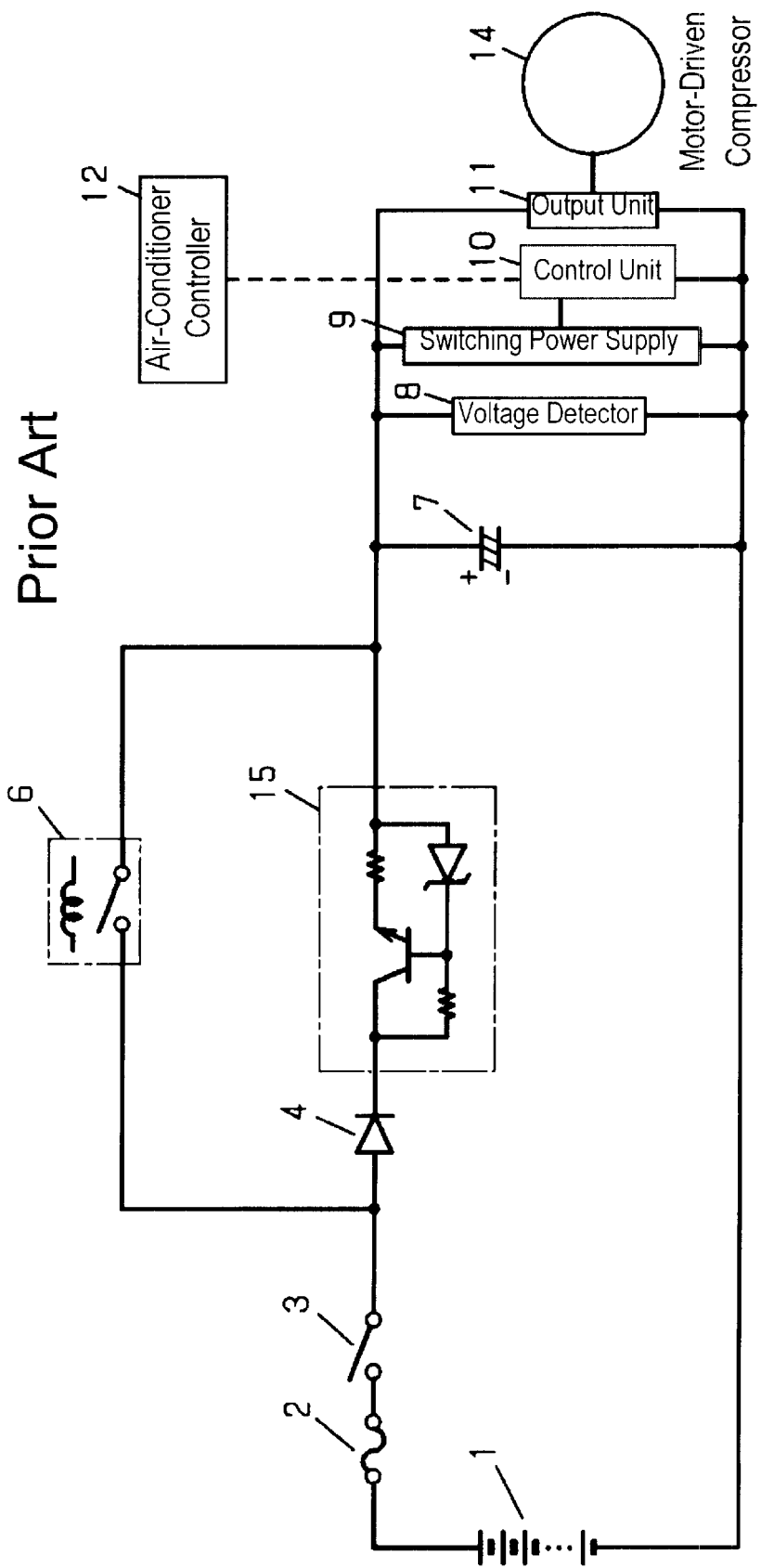
FIG. 10 is a circuit diagram of another conventional air conditioner.

FIG. 8 is a circuit diagram of an air conditioner according to an eighth embodiment of the present invention. In an air conditioner of FIG. 4 in embodiment 4, the output of switching power supply 9 is connected to capacitor 7 via voltage keeping diode 23. The anode of voltage keeping diode 23 is connected to the output of switching power supply 9.

Similarly to embodiment 4, when motor-driven compressor 14 is not in operation, control unit 10 may discharge capacitor 7 by turning off relay 6 and turning off constant-current-charging circuit 15 with charge-ON/OFF photocoupler 19. In that case, for example, capacitor 7 can be discharged by momentarily driving motor-driven compressor 14. In embodiment 4, the voltage of capacitor 7 becomes 0V through the discharge of the capacitor. In embodiment 8, the voltage is kept at the output voltage of switching power supply 9, in detail, at the voltage with a voltage drop in voltage-keeping diode 23 included in the output voltage of switching power supply 9. The voltage is greater than 0V and less than the voltage of battery 1.

This arrangement reduces a power supplied to voltage detector 8 and others as compared with a conditioner in which a voltage of battery 1 is applied, and thus reduces power consumption there. When motor-driven compressor 14 starts, a voltage for charging capacitor 7 is less than the voltage of battery 1, that is, the voltage is equivalent to the value obtained by subtracting the output voltage of the switching power supply from the voltage of battery 1. This allows capacitor 7 to be charged in a shorter time, and allows motor-driven compressor 14 to start in a shorter time.

What is claimed is:

1. An air conditioner comprising:

a power application device coupled in series to a DC power source;

a switch device coupled in parallel with said power application device;

a capacitor charged by said DC power source via said power application device;

a voltage detector for detecting the voltage of said capacitor;

an output unit for driving a motor-driven compressor for air conditioning, said output unit receiving power from said DC power source via said switch device;

a control unit for controlling said output unit; and a power supply for supplying power to said control unit, said power supply receiving power from said DC power source without coupling through said switch device and without coupling through said power application device.

2. The air conditioner of claim 1, wherein said voltage detector is coupled in parallel with said power supply.

3. The air conditioner of claim 1, wherein an output of said power supply is connected to said capacitor.

4. An air conditioner comprising:

a power application device coupled in series to a DC power source;

a switch device coupled in parallel with said power application device;

a capacitor charged by said DC power source via said power application device;

a voltage detector for detecting the voltage of said capacitor;

an output unit for driving a motor-driven compressor for air conditioning, said output unit receiving power from said DC power source via said switch device;

a control unit for controlling said output unit;

a power supply for supplying power to said control unit, and a diode in series with said power supply, an end of said diode coupled between said DC power source and said switch device.

5. The air conditioner of claim 4, wherein said voltage detector is coupled in parallel with said power supply.

6. The air conditioner of claim 4, wherein an output of said power supply is connected to said capacitor.

* * * * *